United States Patent
Grobe

(10) Patent No.: US 8,667,342 B2
(45) Date of Patent: Mar. 4, 2014

(54) METHOD AND APPARATUS FOR REDUCING BIT ERRORS

(75) Inventor: Klaus Grobe, Planegg (DE)

(73) Assignee: Adva Optical Networking Se, Meiningen Ot Dreissigacker (DE)

( * ) Notice: Subject to any disclaimer, the term of this patent is extended or adjusted under 35 U.S.C. 154(b) by 282 days.

(21) Appl. No.: 12/973,167

(22) Filed: Dec. 20, 2010

(65) Prior Publication Data

US 2012/0131395 A1  May 24, 2012

(30) Foreign Application Priority Data

Nov. 23, 2010  (EP) .................................. 10192172

(51) Int. Cl.
*G06F 11/00* (2006.01)

(52) U.S. Cl.
USPC ............................................. 714/704

(58) Field of Classification Search
USPC ................................................ 714/710, 704
See application file for complete search history.

(56) References Cited

U.S. PATENT DOCUMENTS

| 7,333,515 | B1 * | 2/2008 | Ramakrishnan et al. ..... 370/487 |
| 7,539,415 | B2 * | 5/2009 | Park et al. ....................... 398/65 |
| 7,557,747 | B1 * | 7/2009 | Smith et al. ..................... 342/74 |
| 2003/0210908 | A1 | 11/2003 | Levy et al. |
| 2004/0208553 | A1 | 10/2004 | Yang et al. |
| 2007/0177626 | A1 * | 8/2007 | Kotelba ........................ 370/468 |
| 2008/0049787 | A1 | 2/2008 | McNaughton et al. |
| 2009/0168858 | A1 | 7/2009 | Luo |
| 2009/0196624 | A1 | 8/2009 | Zhang |

OTHER PUBLICATIONS

Extended European Search Report for European Patent Application No. 10192172.4 (May 3, 2011).

Teipen et al., "Adaptive optical transmission for dynamic optical networks," Transparent Optical Networks (ICTON), 2010 12th International Conference On, IEEE, Piscataway, NJ, USA, pp. 1-4, XP031733262 (Jun. 27, 2010).

* cited by examiner

*Primary Examiner* — Guy Lamarre
(74) *Attorney, Agent, or Firm* — Jenkins, Wilson, Taylor & Hunt, P.A.

(57) ABSTRACT

The subject matter described herein is directed to an apparatus and a method for reduction of bit errors in continuous data transmission via a data transmission medium, the apparatus having a monitoring unit for monitoring of transceiver parameters of at least one transceiver transmitting said data and/or medium parameters of said data transmission medium and a calculation unit for predicting a time and a duration of an occurrence of at least one event affecting a bit error rate of said continuous data transmission depending on the monitored parameter; and a control unit for throttling a bandwidth of a data switch connected to said transceiver during the predicted duration of the event for bit error reduction.

15 Claims, 8 Drawing Sheets

METHOD AND APPARATUS FOR REDUCING BIT ERRORS

PRIORITY CLAIM

This application claims the benefit of European Patent Application No. 10192172.4 filed Nov. 23, 2010, the disclosure of which is incorporated herein by reference.

TECHNICAL BACKGROUND

The invention relates to a method and an apparatus for reducing bit errors in continuous data transmission via a data transmission medium, in particular via optical fibres.

During transmission of data via a data transmission medium by a transceiver events which reduce the accessible bandwidth can occur. These events can be caused by changes of transceiver parameters of the respective transceiver transmitting the data or by changes of medium parameters of the respective data transmission medium. For example a transceiver can comprise lasers for modulating signals to be transported via an optical data transmission medium. When employing, for example digital supermode distributed bragg reflectors (DSDBR) or similar devices mode jumps can occur due to temperature drift. Such a mode jump can cause a wavelength jump which can cause bit errors, in particular since a laser can not be modulated properly during such a mode jump. Besides transceiver parameters also media parameters of the data transmission medium can cause a disruptive event or a change of the available bandwidth. This includes for example PMD (polarization mode dispersion) in optical transmission lines. Additionally, by chromatic dispersion in case of a disruptive event a jump to a lower wavelength can be caused. These kinds of disruptive events can cause error bursts to such an extend that they can not be corrected by the transceiver receiving the transmitted data via the data transmission medium.

Accordingly, it is an object of the present invention to provide a method and an apparatus for reducing bit errors in continuous data transmission via a data transmission medium in case that disruptive events occur.

SUMMARY OF THE INVENTION

The invention provides a method for reducing bit errors in continuous data transmission via a data transmission medium comprising the steps of:
(a) monitoring of parameters of at least one transceiver transmitting said data and/or parameters of said data transmission medium;
(b) predicting a time and a duration of an occurrence of at least one event affecting a bit error rate of said continuous data transmission depending on the monitored parameters; and
(c) throttling a bandwidth of a data switch connected to said transceiver during the predicted duration of the event for bit error reduction.

In a possible embodiment of the method according to the present invention the event is formed by a triggerable event. These kinds of events are unavoidable but can be triggered, i.e. the exact start time of the event is known and can be predicted. Further, the triggerable event can be triggered, i.e. caused automatically in response to an action.

In an alternative embodiment of the method according to the present invention the event is formed by a non-triggerable event. For these kind of events the start time can only be predicted approximately, e.g. by estimating when a certain threshold level will be crossed.

In a possible embodiment of the method according to the present invention the event is a triggerable event which is triggered before the predictd occurrence time of said event.

In a possible embodiment of the method according to the present invention the monitored parameters comprise electrical control currents controlling a laser of the transceiver.

In a still further embodiment of the method according to the present invention the monitored transceiver parameters comprise a temperature of the respective laser.

In a possible embodiment of the method according to the present invention the monitored transmission medium parameters comprise a polarization mode dispersion.

In a still further possible embodiment of the method according to the present invention the monitored transmission medium parameters also comprise an attenuation of a fibre connected to the transceiver.

The invention further provides an apparatus comprising the features of claim 6.

The invention provides an apparatus for reduction of bit errors in continuous data transmission via a data transmission medium comprising:
(a) a monitoring unit for monitoring of parameters of at least one transceiver transmitting said data and/or parameters of said data transmission medium;
(b) a calculation unit for predicting a time and a duration of an occurrence of at least one event affecting a bit error rate of said continuous data transmission depending on the monitored parameters; and
(c) a control unit for throttling a bandwidth of a data switch connected to said transceiver during the predicted duration of the event for bit error reduction.

In a possible embodiment of the apparatus according to the present invention the data transmission medium connected to the transceiver comprises a wired data transmission medium.

In a possible embodiment of the apparatus according to the present invention the wired data transmission medium coinprises at least one optical fibre connected to the transceiver.

In a possible embodiment of the apparatus according to the present invention the transceiver comprises at least one tuneable laser for modulating a data stream provided by the data switch in response to electrical control currents to provide a modulated optical signal transmitted by the transceiver via an optical fibre connected to the laser.

In a possible embodiment of the apparatus according to the present invention the tuneable laser comprises a multi section DBR (Distribution Bragg Reflector)-laser.

In a possible embodiment of the apparatus according to the present invention the predicted events predicted by the calculation unit comprises a mode jump of the laser due to temperature drift.

In a possible embodiment of the apparatus according to the present invention the duration of a mode jump event is calculated by said calculation unit depending on a mean mode jump duration, a relative group delay caused by chromatic dispersion of the optical fibre and a lock-in time of a remote clock data recovery circuit of a remote transceiver receiving the modulated optical signal.

In a possible embodiment of the apparatus according to the present invention the data switch is a layer 2 data switch connected to a data network.

In a possible embodiment of the apparatus according to the present invention the data network is formed by an Ethernet network.

The invention further provides an optical network unit (ONU) comprising at least one transceiver connectable to a data transmission medium, at least one data switch connectable to a data network and a bit error reduction apparatus for the reduction of bit errors in continuous data transmission via a data transmission medium comprising:

(a) a monitoring unit for monitoring of parameters of at least one transceiver transmitting said data and/or parameters of said data transmission medium;

(b) a calculation unit for predicting a time and a duration of an occurrence of at least one event affecting a bit error rate of said continuous data transmission depending on the at least one monitored parameter; and (c) a control unit for throttling a bandwidth of a data switch connected to said transceiver during the predicted duration of the event for bit error reduction.

BRIEF DESCRIPTION OF THE FIGURES

In the following possible embodiments of the method and apparatus for reducing bit errors in continuous data transmission via a data transmission medium are described with reference to the enclosed figures.

DETAILED DESCRIPTION OF EMBODIMENTS

Figure 1:
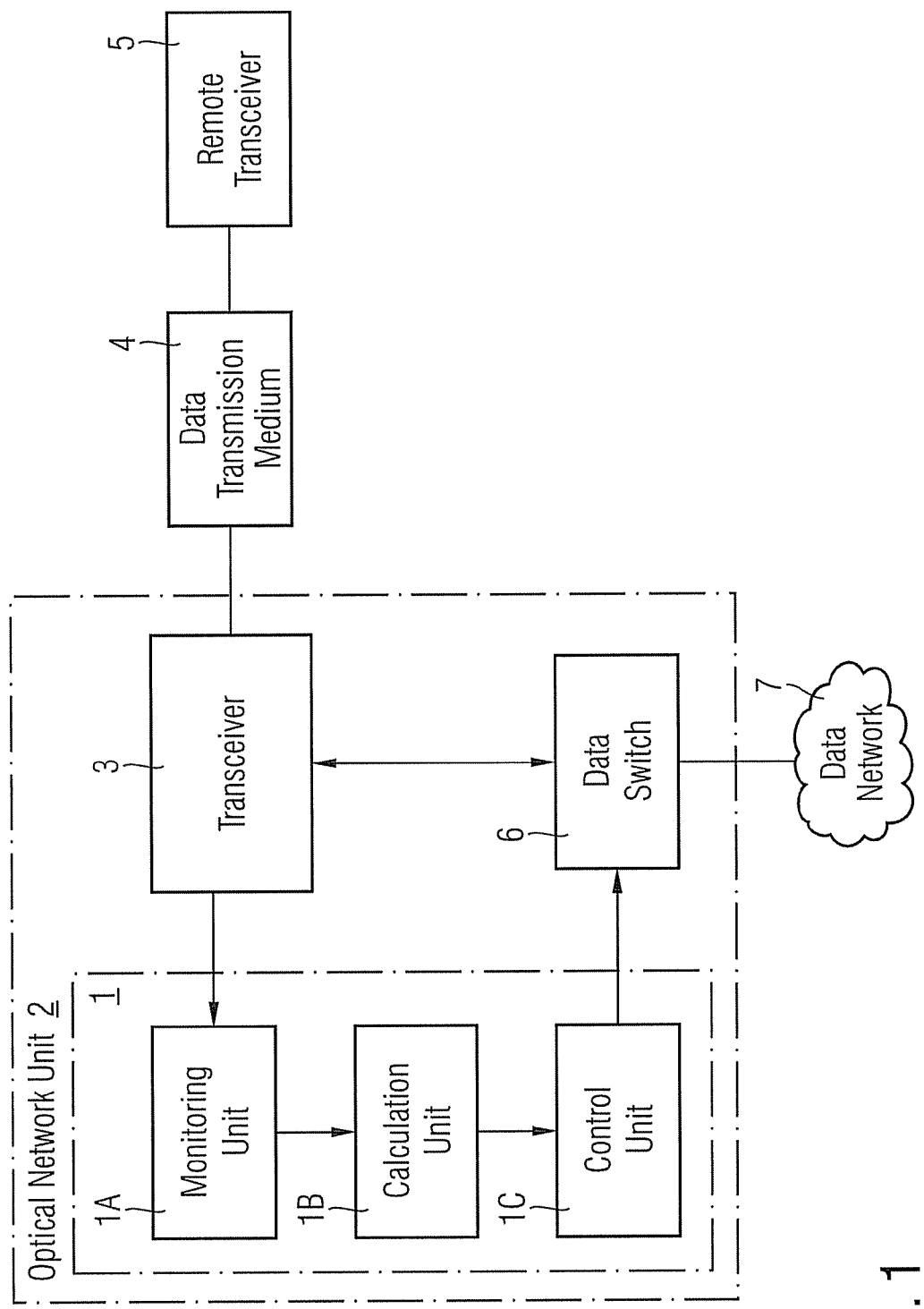
FIG. 1 shows a block-diagram of a possible embodiment of an apparatus for reducing bit errors in continuous data transmission via a data transmission medium according to the present invention.

As can be seen in FIG. 1 an apparatus 1 for reduction of bit errors in continuous data transmission via a data transmission medium can form part of an optical network unit 2. The optical network unit 2 comprises at least one transceiver 3 which is connectable to a data transmission medium 4. The data transmission medium 4 it is in a preferred embodiment a wired data transmission medium. The wired data transmission medium can comprise an electrical data transmission medium or an optical data transmission medium. In a preferred embodiment the data transmission medium 4 is formed by an optical data transmission medium, in particular by one or several optical fibres. The data is transmitted by the transceiver 3 via the data transmission medium 4 to a remote transceiver 5 for further processing. It can be seen in FIG. 1 that the transceiver 3 is connected to a data switch 6 which comprises an interface to a data network 7. The data network 7 can be for example formed by an Ethernet network. The data switch 6 can be formed by a layer 2 data switch connected to the data network 7.

The apparatus 1 for reduction of bit errors in the continuous data transmission via the data transmission medium 4 comprises as shown in FIG. 1 a monitoring unit 1A, a calculation unit 1B and a control unit 1C. The monitoring unit 1A is connected to the transceiver 3 and is provided for monitoring parameters of the transceiver 3. In a further possible embodiment the monitoring unit 1A can also be provided for monitoring parameters of the data transmission medium 4. In this alternative embodiment the monitoring unit 1A can also be connected directly to the data transmission medium 4 to monitor medium parameters of the data transmission medium 4.

The apparatus 1 further comprises a calculation unit 1B for predicting a time and a duration of an occurrence of at least one event affecting a bit error rate BER of the continuous data transmission depending on the monitored parameter. In a possible embodiment the monitoring unit 1A monitors one parameter. In a further possible embodiment the monitoring unit 1A monitors several parameters of the transceiver 3. In a still further embodiment the monitoring unit 1A monitors one or several parameters of the data transmission medium 4. As can be seen in FIG. 1 the calculation unit 1B is connected to a control unit 1C. The control unit 1C is provided for throttling a bandwidth of the data switch 6 connected to the transceiver 3 during the predicted duration of the event for bit error reduction. As can be seen in FIG. 1 the control unit 1C controls the data switch 6 via control lines for throttling a bandwidth of the data switch 6 during the predicted duration of the event.

A transceiver 3 can comprise at least one tuneable laser for modulating a data stream provided by the data switch 6 in response to electrical control currents to provide a modulated optical signal transmitted by the transceiver 3 via an optical fibre of the optical data transmission medium 4 connected to the respective laser. This tuneable laser can comprise for example a multi section DBR (Distribution Bragg Reflector)-laser. The event predicted by the calculation unit 1B can comprise a mode jump of the laser due to a temperature drift. In a possible embodiment the duration of the mode jump event is calculated by the calculation unit 1B depending on a mean mode jump duration, a relative group delay caused by chromatic dispersion of the optical fibre and a lock-in time of a remote clock data recovery circuit of the remote transceiver 5 receiving the modulated optical signal. In a possible embodiment the monitored transceiver parameters of the transceiver 3 monitored by the monitoring unit 1A can comprise electrical control currents controlling the laser of the transceiver 3 as well as the temperature of the respective laser. In a possible embodiment the monitoring unit 1A can not only monitor parameters of the transceiver 3 but also parameters of the data transmission medium 4. These monitored transmission medium parameters can comprise for example a polarization mode dispersion and an attenuation of a fibre connected to the transceiver 3.

The apparatus 1 integrated in the optical network unit 2 as shown in FIG. 1 predicts events and controls the bandwidth of the data switch 6 by throttling a bandwidth of the data switch 6 during the predicted duration of the event for bit error reduction. These events can comprise in a possible embodiment triggerable events. In a possible embodiment the events can also comprise non-triggerable events. Triggerable events are unavoidable events but can be triggered, i.e. the exact start time of the respective event can be predicted and calculated. Further triggerable events can be triggered, i.e. they can be caused automatically in response to a controlled action. Non-triggerable events comprise events where the start time can only predicted approximately, e.g. by estimating when a certain threshold level will be reached or crossed. By monitoring relevant parameters error bursts which would be caused by the triggered event type can be avoided by throttling the bandwidth of the data switch 6 for the duration of the predicted event in advance. In case of a DS-DBR laser provided in the transceiver 3 the mode behaviour can be monitored by the monitoring unit 1A and upcoming events such as mode jumps can be taken into account when controlling the data switch 6. A constraint aware control plane can be used for fibre plant monitoring and signal events like decreasing optical bandwidth caused for example by increasing PMD can be signalled to the client layer, e.g. to the layer 2 data switch 6. The apparatus 1 as shown in FIG. 1 comprises a monitoring instance which monitors relevant transmission (layer 1) parameters and a control instance which is capable of controlling, e.g. throttling, the layer 2 throughput of the data switch 6. The units 1A, 1B, 1C of the apparatus 1 can be formed by separate entities but can also be integrated in a common entity such as a micro controller. The apparatus 1 monitors the relevant parameters under consideration. For example, when a certain threshold is crossed the apparatus 1 can predict that a disruptive event will occur (in the future) and/or the available bandwidth will have to be reduced. For certain events the apparatus 1 can estimate the time and duration of the event and also trigger these events. In case of short events the apparatus 1 can signal the respective data to the control instance. The control instance can then throttle the layer 2 throughput of an associated client down to zero and trigger the event exactly for the predicted time and duration. Thus, no error bursts occur at the cost of zero throughput for that time.

In a possible embodiment suitable Tx/Rx Buffers are provided so that the data transmission can stay almost uninterrupted given the duration of the disruptive event is relatively short. In case of longer events of the non-triggerable type the bandwidth of the respective client can be throttled, accordingly. In a possible embodiment the monitoring performed by the monitoring unit 1A of the apparatus 1 can also lead to further actions such as sending an alarm message or protection switching etc. In the apparatus 1 as shown in FIG. 1 error bursts and transmissions where the time variance of any relevant parameter may cause short disruptive events are avoided. In particular, DS-DBR lasers can be affected by mode jumps which cause short error bursts. To smoothen this effect an error burst suppression can be performed with the apparatus 1 according to the present invention by throttling the layer 2 throughput of the data switch 6 and then triggering a mode jump. In case of a DS-DBR laser monitoring can be part of the laser device. In a possible implementation the laser device can signal all device or transceiver parameters to the apparatus 1 which is then able to predict for example mode jumps. The apparatus 1 can also calculate an outage time during the mode jump and then trigger it. The outage time consists of the jump time itself plus a contribution which is necessary until the remote end CDR is locked in again plus a contribution which depends from the jump type. If the remaining frequency deviation after the jump is positive, i.e. a jump onto a slightly higher frequency, then additional ISI can occur because the first symbols after the mode jump overlap with the last one before due to chromatic dispersion CD. With the exception of the CD included ISI, this event is similar to triggered protection switch events. In the more general case of non-triggered events monitoring of relevant parameters can be ensured, i.e. by physical layer monitoring. The apparatus 1 can compare these parameters against free set thresholds and predict that e.g. an available bandwidth will be decreased. The apparatus 1 can then in advance signal via its control instance that layer 2 throughput of the data switch 6 needs to be throttled to a certain level. In a possible embodiment monitoring is then continued in order to further track the event, i.e. to further decrease bandwidth or to increase it again to the Committed Information Rate (CIR).

Figure 2:
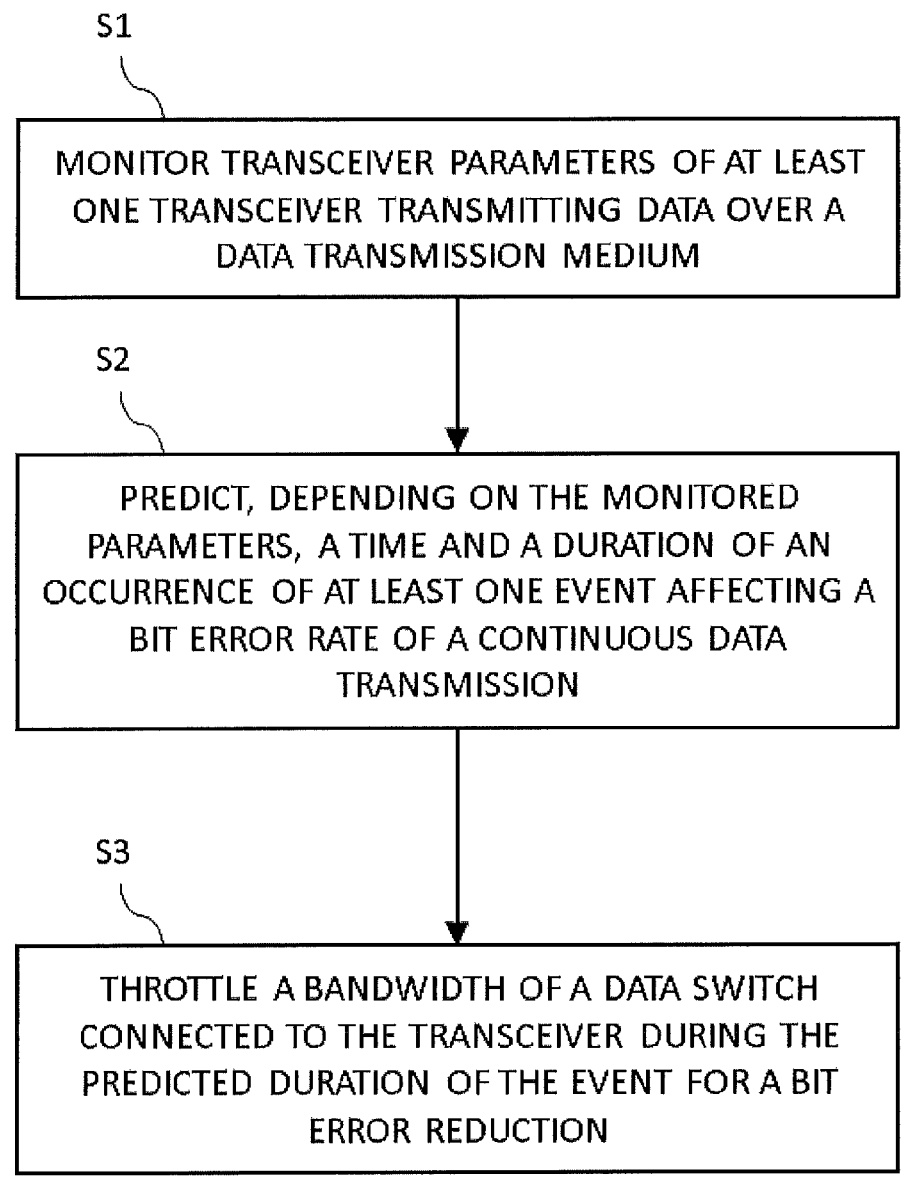
FIG. 2 shows a flowchart of a possible embodiment of a method for reducing bit errors in continuous data transmission via a data transmission medium according to the present invention.

FIG. 2 shows a flowchart of a possible embodiment of a method for reducing bit errors in continuous data transmission via a data transmission medium according to the present invention.

In a first step S1 transceiver parameters of at least one transceiver 3 transmitting data over a data transmission medium 4 are monitored. The transceiver can be transceiver such as shown in FIG. 1. The data transmission medium 4 can be formed by a optical data transmission medium. In a possible embodiment also medium parameters of the data transmission medium 4 are monitored in step S1.

In a further step S2 a time and a duration of an occurrence of at least one event affecting a bit error rate BER of the continuous data transmission 4 is predicted depending on the monitored parameters. In step S2 a time and a duration of an occurrence of at least one event affecting the bit error rate BER can be calculated depending on the monitored parameters comprising transceiver parameters and/or medium parameters monitored in step S1. A predicted event can be for example a mode jump of a laser within the transceiver 3 due to temperature drift. The duration of such a mode jump event can be calculated depending on a mean mode jump duration, a relative group delay caused by chromatic dispersion of the respective optical fibre and depending on a lock-in time of the remote clock data recovery circuit of a remote transceiver receiving the modulated optical signal.

In a further step S3 a bandwidth of a data switch connected to the transceiver 3 is throttled during the predicted duration of the event for bit error reduction. For example the bandwidth of the data switch 6 as shown in FIG. 1 is throttled during the predicted duration of the event. In a possible embodiment the bandwidth is throttled to zero. In an alternative embodiment the bandwidth is throttled to a predetermined lower bandwidth.

Figure 3:
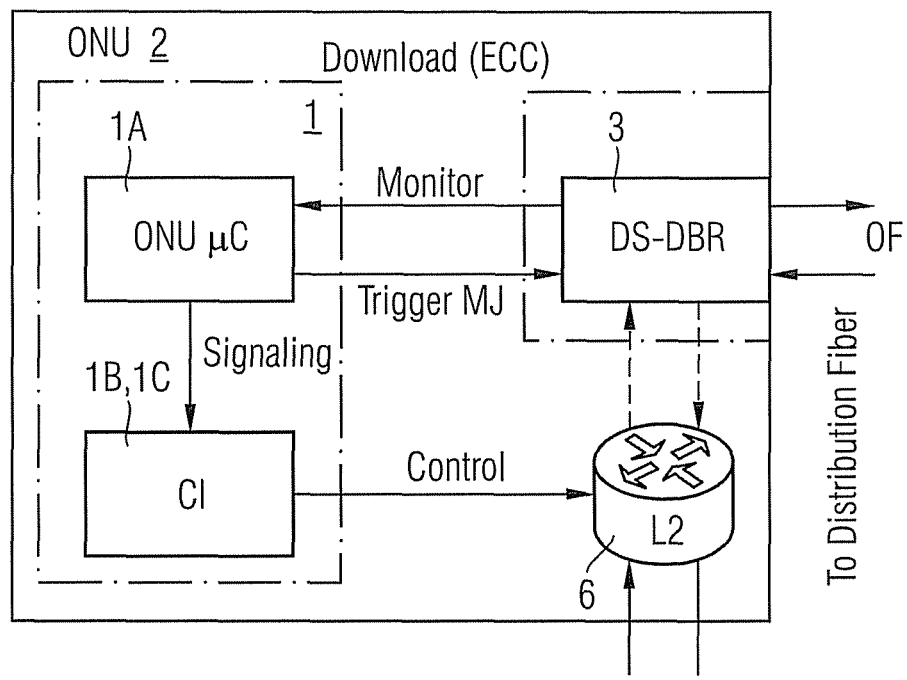
FIG. 3 shows a block-diagram of a possible embodiment of an apparatus for reducing bit errors in continuous data transmission via a data transmission medium according to the present invention.

FIG. 3 shows a possible implementation of an optical network unit 2 comprising an apparatus 1 according to the present invention. In the shown embodiment the transceiver 3 comprises a DS-DBR i.e. a multisection Distribution Bragg Reflector laser. A monitoring unit 1A is formed in the shown embodiment by a micro controller connected to a control instance CI in which the calculation unit 1B and the control unit 1C are integrated. The DS-DBR is connected to an optical fibre OF.

Figure 4:
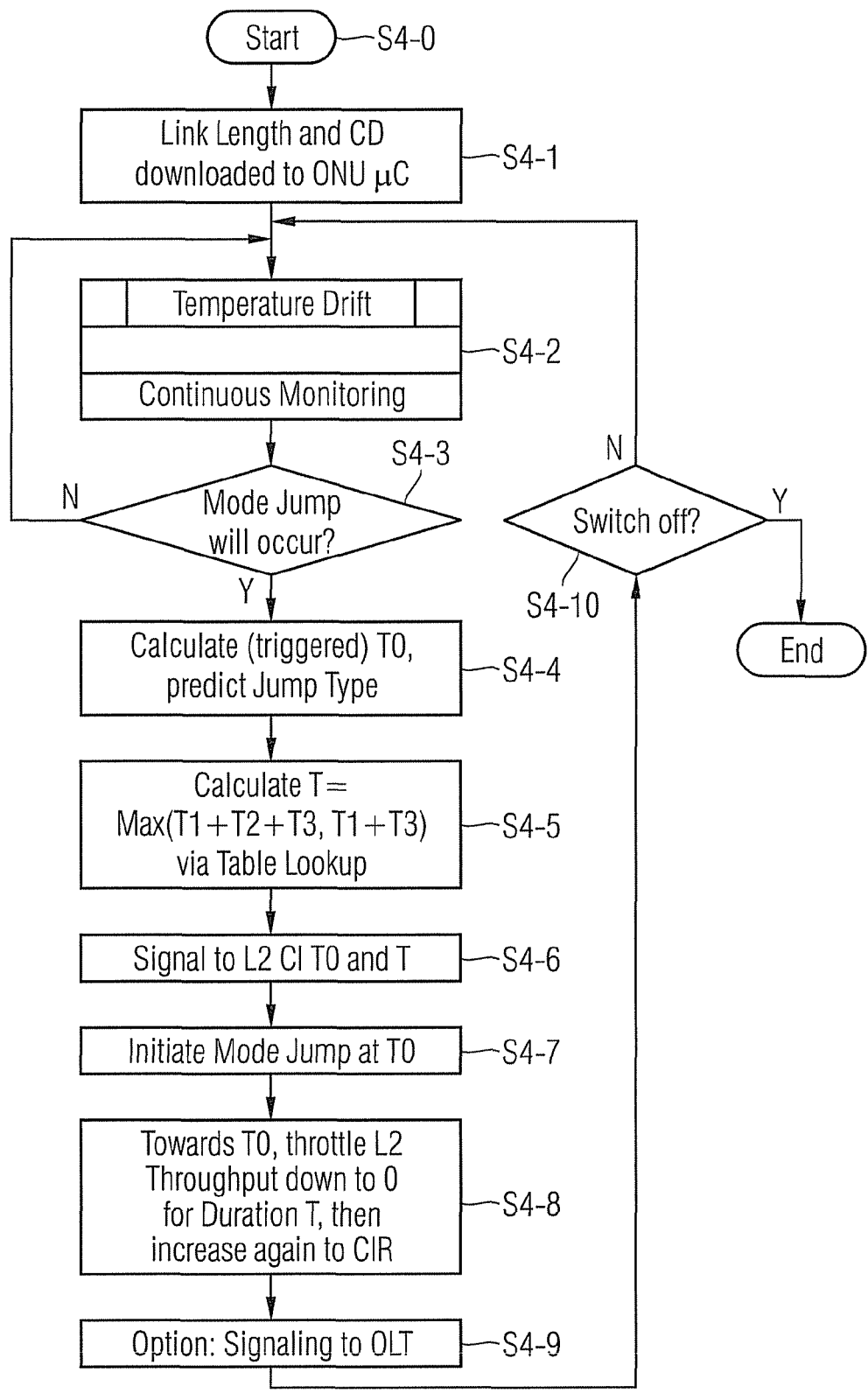
FIG. 4 shows a flowchart of a possible embodiment of a method for reducing bit errors in continuous data transmission via a data transmission medium according to the present invention.

FIG. 4 shows a flowchart of a possible implementation of a method for reducing bit errors in continuous data transmission via a data transmission medium according to the present invention. With the shown method one can provide a suppression of error bursts during laser mode jumps in WDMPON can be for example be executed by the apparatus 1 shown in FIG. 3. After a start step S4-0 a link length and a chromatic dispersion (CD) can be downloaded in a step S4-1 to the ONU micro controller 1A as shown in FIG. 3 for example in an embedded communication channel ECC.

In a further step S4-2 a temperature drift is monitored by the microcomputer 1A and it is decided in step S4-3 whether a mode jump will occur. If a mode jump will occur a time $T_0$ is calculated wherein $T_0$ is a time where the mode jump will occur. Further, in a possible embodiment a mode jump type can be predicted.

In a step S4-5 a time T is calculated, wherein $T=\max.(T1+T2+T3, T1+T3)$ wherein T1 is a mean mode jump duration,
wherein T2 is a relative (differential) group delay caused by chromatic dispersion CD (T2>0 for jumps to shorter wavelength S, $GD_{before} > GD_{after}$ (GD: group delay) and
wherein T3 is the lock-in time of a remote clock data recovery circuit of a receiving transceiver. The calculation of T can be performed in a possible implementation by means of a look-up table.

In a further step S4-6 a layer 2 client such as a data switch 6 is informed about the point in time where the mode jump occurs, i.e. $T_0$ and the length of the disrupted event, i.e. the calculated time T.

In a further step S4-7 a mode jump is initiated at the calculated time $T_0$. Further, in a step S4-8 the data throughput of the layer 2 client, e.g. the data switch 6, is throttled down to zero at time $T_0$ for a time duration T and then increased again to CIR. In a possible implementation a signalling to OLT (Optical Line Terminal) in step S4-9 is performed. In step S4-10 it is checked whether the apparatus is switched off. If the apparatus is switched off the process returns to step S4-2 as shown in FIG. 4.

Figure 5:
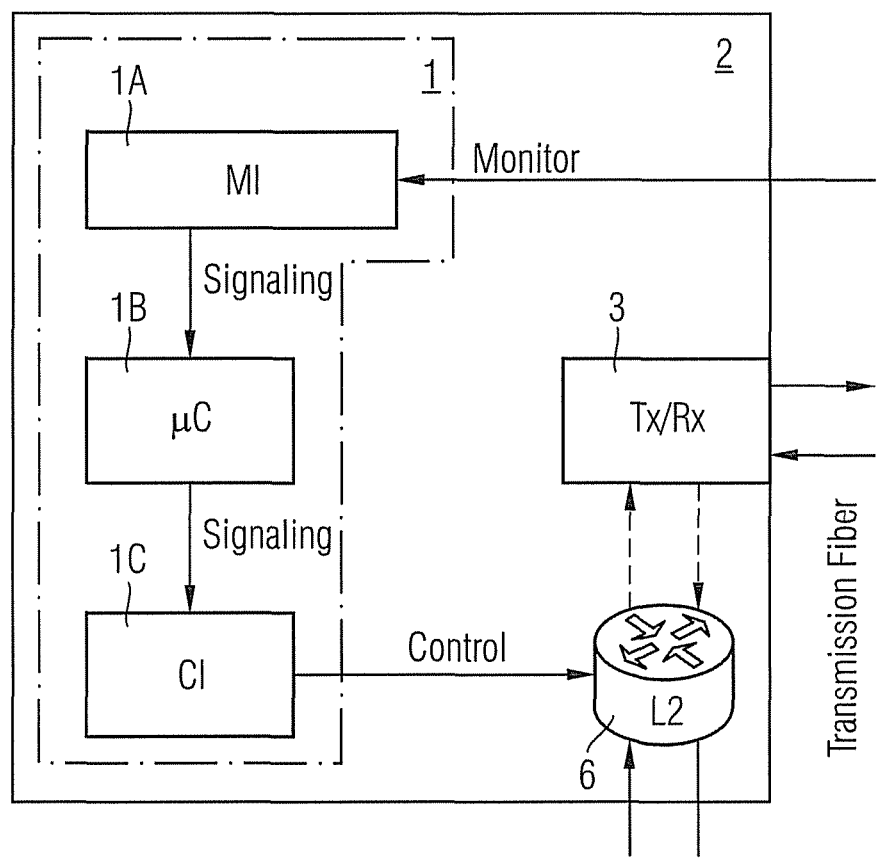
FIG. 5 shows a block-diagram of a further possible embodiment of an apparatus for reducing bit errors in continuous data transmission via a data transmission medium according to the present invention.

FIG. 5 shows a further possible implementation of an optical network unit 2 comprising an apparatus 1 according to the present invention. This embodiment is provided for throttling of layer 2 bandwidth during non-triggered or non-triggerable data transmission events.

Figure 6:
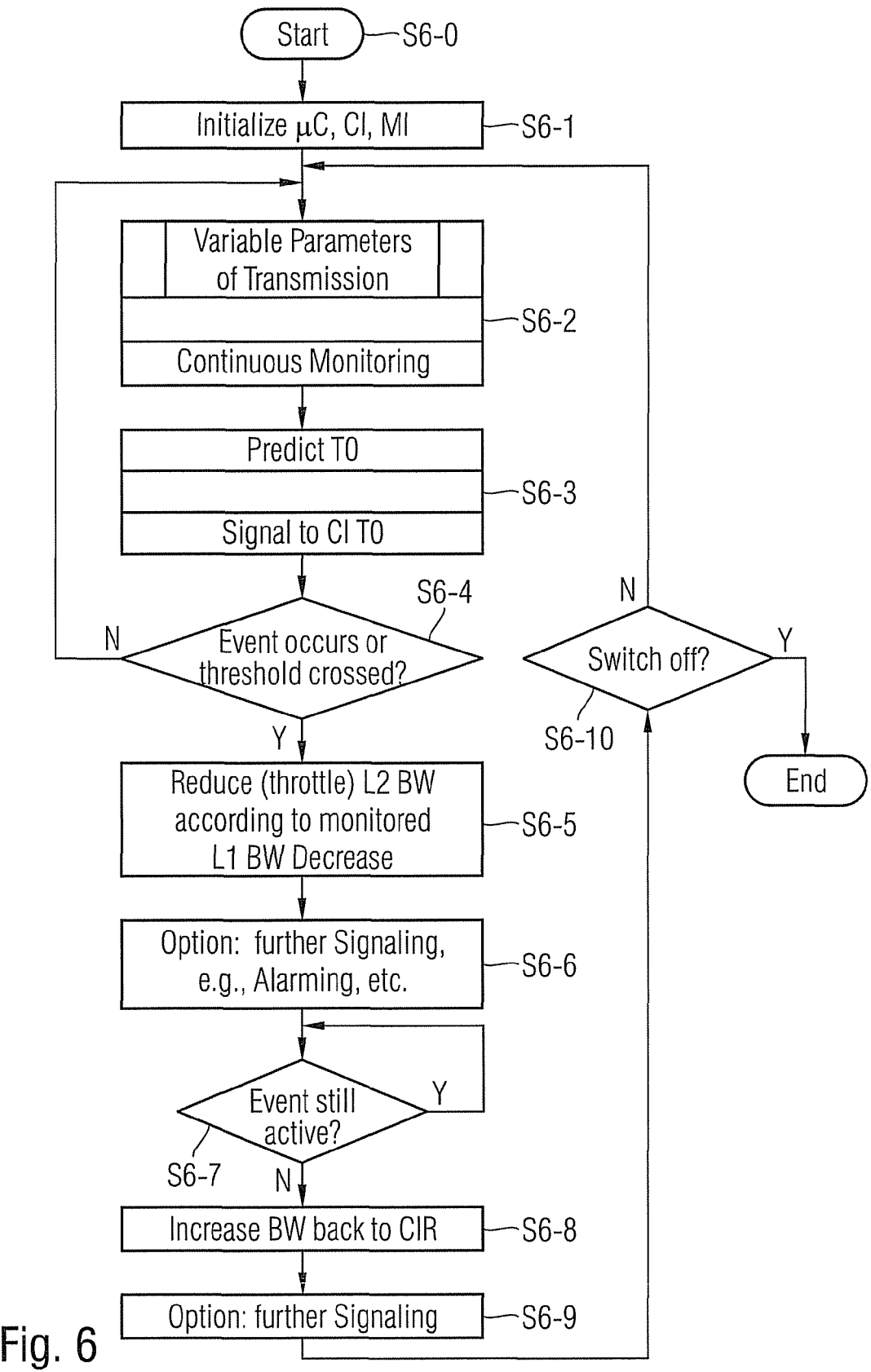
FIG. 6 shows a flowchart of a further possible embodiment of a method for reducing bit errors in continuous data transmission via a data transmission medium according to the present invention.

FIG. 6 shows a possible implementation of a method for reducing bit errors in continuous data transmission as performed by the apparatus 1 shown in FIG. 5. After a start step S6-0 the microcontroller 1B as well as the control instance 1C and the monitoring instance 1A are initialized in step S6-1. In a further step S6-2 change of transmission parameters, e.g. transceiver parameters and/or medium parameters are continuously monitored by the monitoring unit 1A. In a possible embodiment the monitoring unit 1A monitors only medium parameters of the data transmission medium 4 and in particular the parameters of an optical fibre.

In a further step S6-3 a point in time $T_0$ is predicted where an event occurs (which can not be triggered). This can be a time where a certain predetermined threshold is crossed. This calculated predicted point in time $T_0$ is signalled by the calculation unit 1B to the control instance 1C. In step S6-4 it is checked whether the event has occurred or the threshold value has been crossed. If this is the case the layer 2 bandwidth is reduced or throttled in step S6-5 according to the monitored layer 1 bandwidth decrease monitored by monitoring unit 1A in step S6-2. In a further optional step S6-6 the apparatus 1 can signal the layer 2 bandwidth reduction, e.g. by sending a corresponding alarm signal.

In step S6-7 it can be checked whether the event is still active. If the event is no longer active the bandwidth can be increased back to CIR in step S6-8. In a further optional step S6-9 this can be signalled by the apparatus 1. In step S6-10 it is checked whether the apparatus is switched off. If the apparatus is not switched off the process returns to step S6-2 as shown in FIG. 6.

Figure 7:
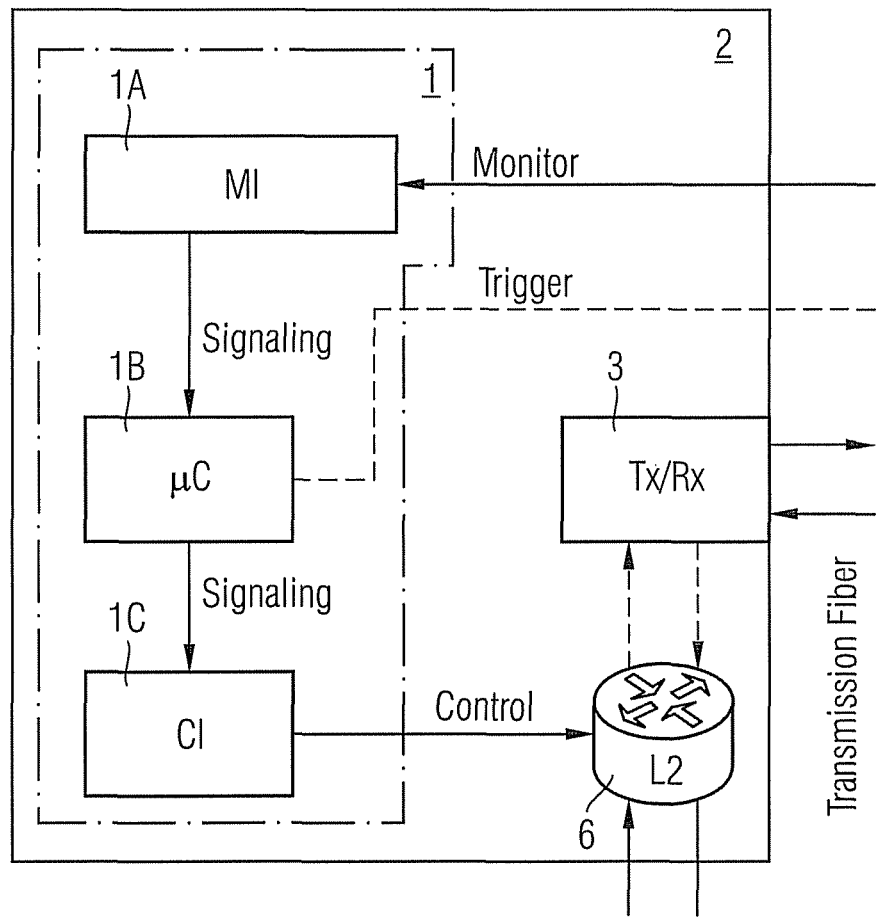
FIG. 7 shows a block-diagram of a further embodiment of an apparatus reducing bit errors in continuous data transmission via a data transmission medium according to the present invention.

FIG. 7 shows a block-diagram of a further possible embodiment of an apparatus 1 for reducing bit errors in continuous data transmission via a data transmission medium according to the present invention. In the embodiment shown in FIG. 7 the apparatus 1 is provided for suppression of error bursts during short triggered disruptive transmission events. As shown in FIG. 7 the microcontroller 1B can trigger an event.

Figure 8:
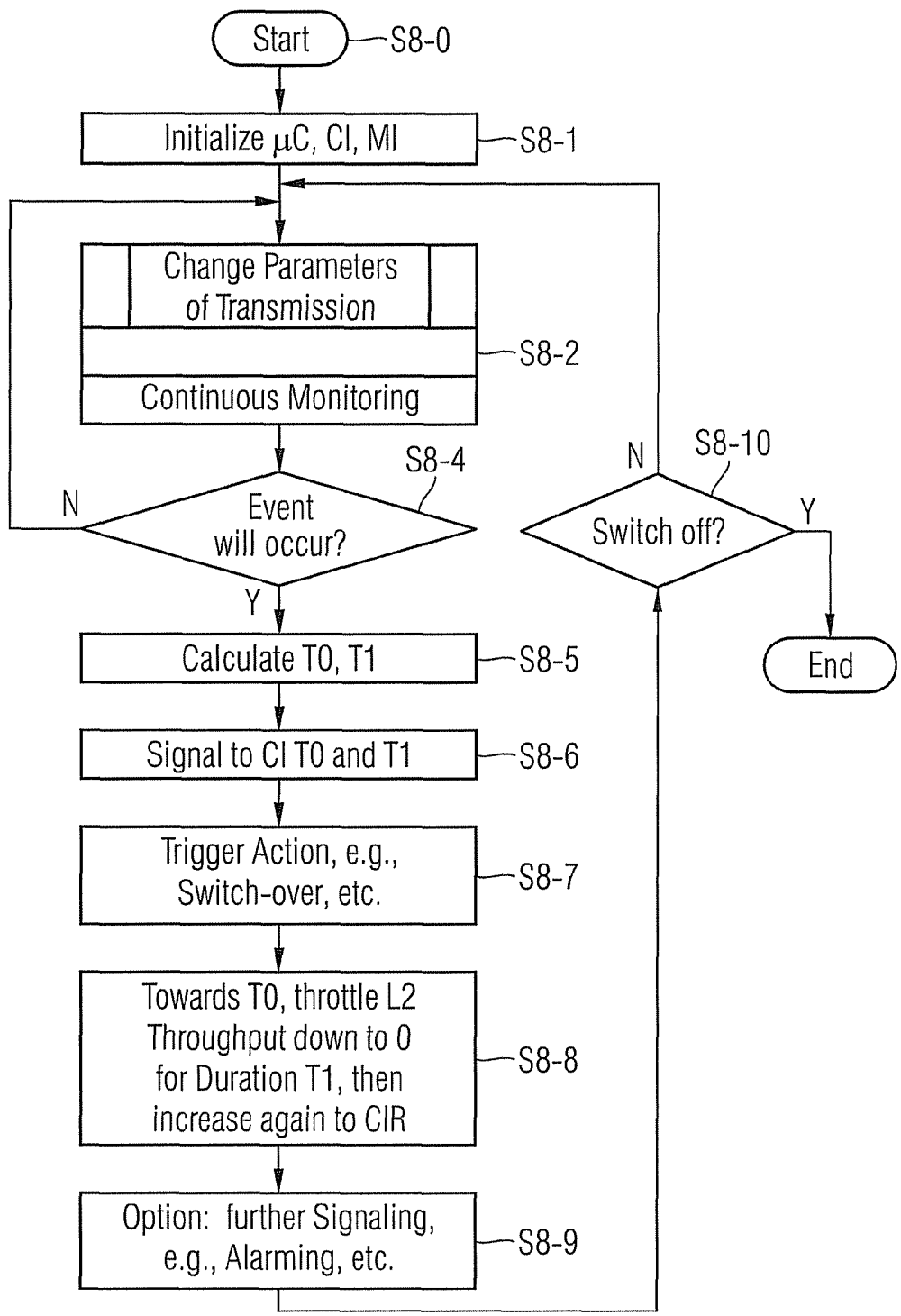
FIG. 8 shows a flowchart of a possible embodiment of a method for using bit errors in continuous data transmission via a data transmission medium according to the present invention.

FIG. 8 is a flowchart of a possible embodiment of a method for reducing bit errors in continuous data transmission executed by the exemplary embodiment of apparatus 1 as shown in FIG. 7.

In a start step S8-0 the monitoring unit 1A, microcontroller 1B as well as the control unit 1C are initialized in step S8-1. A change of transmission parameters is continuously monitored by the monitoring unit 1A in step S8-3. These transmission parameters comprise transceiver parameters such as parameters of a laser provided within the transceiver 3 as well as medium parameters.

In a further step S8-4 it is checked whether a disruptive event (which can be triggered) will occur. For example, it is checked whether a mode jump can be expected within a predetermined time for example within the next five seconds.

In a further step S8-5 a time $T_0$ is calculated by the microcontroller 1B indicating a point in time where the event occurs. Furthermore, the microcontroller 1B calculates a mean event duration T1 in step S8-5.

The calculated point in time when the event starts $T_0$ and the mean event duration T1 are signalled by the microcontroller 1B to the control unit 1C in step S8-6.

In a further step S8-7 the action is triggered by the microcontroller 1B, e.g. a switch-over etc.

In a further step S8-8 the layer 2 bandwidth is throttled at the calculated point in time T0 wherein the throughput can be reduced down to zero for the calculated mean event duration T1. After the mean event duration T1 has passed the throughput can be increased again to the CIR (Committed Information Rate).

In a further optional step S8-9 the apparatus 1 can perform further a signalling such as sending an alarm signal. In step S8-10 it is checked whether the apparatus 1 is switched off. If the apparatus 1 is not switched off the process returns to step S8-3 as shown in FIG. 8.

With the method and apparatus according to the present invention it is possible to avoid error bursts in data transmissions where the time variance of any relevant parameter may cause short disruptive events. Error bursts can be reduced or fully omitted by throttling for example an Ethernet data stream in advance. This is possible because for example a mode jump can be predicted. The duration of the throttling period can be adjusted in a possible embodiment according to the mode jump and link, i.e. chromatic dispersion and link characteristics. In a possible embodiment the data throughput is reduced for a very short period T down to zero but providing the advantage that no error burst is caused. In particular, this does not affect applications like video or music data streaming. In combination with a suitable data buffer no quality of service (QoS) decrease is perceivable for the user.

The invention claimed is:
1. A method for reducing bit errors in a continuous data transmission via a data transmission medium, comprising:
   (a) monitoring of parameters of at least one transceiver transmitting said data and/or parameters of said data transmission medium;

(b) predicting a time and a duration of an occurrence of at least one event affecting a bit error rate (BER) of said continuous data transmission depending on the monitored parameters; and
(c) throttling a bandwidth of a data switch connected to said transceiver during the predicted duration of the event for bit error reduction.

2. The method according to claim 1, wherein said event is formed by either one of a triggerable and by a non-triggerable event.

3. The method according to claim 2, wherein said event is a triggerable event which is triggered before the predicted time of occurrence of said event.

4. The method according to claim 1, wherein said monitored parameters comprise electrical control currents controlling a laser of said transceiver and a temperature of said laser.

5. The method according to claim 1, wherein said monitored parameters comprise a polarization mode dispersion and an attenuation of a fibre connected to said transceiver.

6. An apparatus for reduction of bit errors in a continuous data transmission via a data transmission medium comprising:
(a) a monitoring unit for monitoring of parameters of at least one transceiver transmitting said data and/or parameters of said data transmission medium;
(b) a calculation unit for predicting a time and a duration of an occurrence of at least one event effecting a bit error rate (BER) of said continuous data transmission depending on the monitored parameters; and
(c) a control unit for throttling a bandwidth of a data switch connected to said transceiver during the predicted duration of the event for bit error reduction.

7. The apparatus according to claim 6, wherein said data transmission medium being connected to said transceiver comprises a wired data transmission medium.

8. The apparatus according to claim 7, wherein said wired data transmission medium comprises at least one optical fibre connected to said transceiver.

9. The apparatus according to claim 6, wherein said transceiver comprises at least one tuneable laser for modulating a data stream provided by said data switch in response to electrical control currents to provide a modulated optical signal transmitted by said transceiver via an optical fibre connected to said laser.

10. The apparatus according to claim 9, wherein said tuneable laser comprises a multisection DBR (Distribution Bragg Reflector)-laser.

11. The apparatus according to claim 10, wherein the predicted event is a mode jump of said laser due to temperature drift.

12. The apparatus according to claim 11, wherein the duration of said mode jump event is calculated by said calculation unit depending on a mean mode jump duration, a relative group delay caused by chromatic dispersion of said optical, fibre and a lock in time of a remote clock data recovery circuit (CDR) of a remote transceiver receiving said modulated optical signal.

13. The apparatus according to claim 6, wherein the data switch is a layer 2 data switch connected to a data network.

14. The apparatus according to claim 13, wherein the data network is an Ethernet network.

15. An optical network unit comprising:
at least one transceiver connectable to a data transmission medium;
at least one data switch connectable to a data network and the bit error reduction apparatus according to claim 6.

* * * * *